Dec. 8, 1925.　　　　　　　　　　　　　　　　　　　　　1,564,476
C. S. FRANKLIN
HIGH FREQUENCY ALTERNATOR
Filed June 21, 1921

Inventor
CHARLES SAMUEL FRANKLIN.
By his Attorney

Patented Dec. 8, 1925.

1,564,476

UNITED STATES PATENT OFFICE.

CHARLES SAMUEL FRANKLIN, OF LONDON, ENGLAND, ASSIGNOR TO RADIO CORPORATION OF AMERICA, A CORPORATION OF DELAWARE.

HIGH-FREQUENCY ALTERNATOR.

Application filed June 21, 1921. Serial No. 479,361.

(GRANTED UNDER THE PROVISIONS OF THE ACT OF MARCH 3, 1921, 41 STAT. L., 1313.)

*To all whom it may concern:*

Be it known that I, CHARLES SAMUEL FRANKLIN, a British subject, residing at London, England, have made certain new and useful Improvements in High-Frequency Alternators (for which I have filed an application in Great Britain October 17, 1913, Patent No. 23,557), of which the following is a specification accompanied by drawings, in which—

Figure 1:
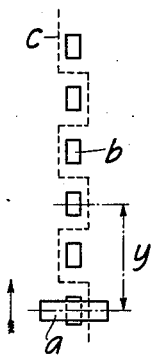
Figure 2:
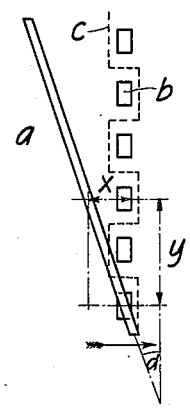
Figure 3:
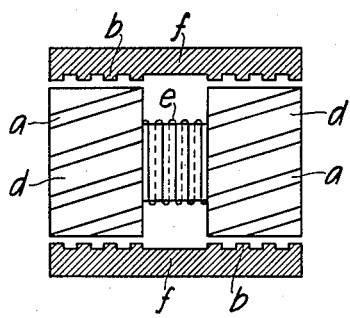
Figure 4:
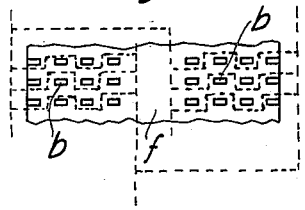

Figure 1 is a diagram showing the operation of the usual form of inductor alternator, Figure 2 is a diagram showing the operation of an inductor alternator according to my invention, Figure 3 is a section through an alternator according to this invention, and Figure 4 is a developed view of the stator of an alternator according to my invention showing the method of placing the windings about the teeth.

It is well known that the limit of frequency for which an alternator can be designed depends upon the smallest width of pole face practicable and upon the peripheral speed of the rotor allowable.

This invention enables an alternator to be constructed which will give a frequency of several times the frequency of a simple alternator without increasing the pole width or the peripheral speed of the rotor.

According to this invention the stator has a number of poles separated from each other and arranged in a line and the rotor has a long pole making a small angle to this line so that it passes in succession across the poles of the stator.

In Figure 1 $a$ is an armature moving in the direction of the arrow over poles $b$ with a winding $e$. The frequency given by such a machine is $v/y$, $v$ being the velocity of $a$ in feet per second, and $y$ the distance in feet between the centres of two like poles.

In Figure 2 which illustrates the principle of an inductor alternator constructed in accordance with my invention, $a$ is the long pole of the armature moving in the direction of the arrow across the poles of the stator. In this case the frequency is $$\frac{v}{x} = \frac{v}{y \tan a},$$

$a$ being the angle between the long pole and the line of poles where $x$ and $y$ have the relation $\frac{x}{y} = \tan a$.

Assuming therefore that the velocity of the armature is the same in both cases the frequency of an alternator constructed according to Diagram 2 is considerably greater than those of one constructed according to Diagram 1.

By decreasing the width of the poles $b$ it is possible to reduce the angle $a$ and still further to increase the frequency.

In practice the stator of the alternator may conveniently consist of a cylinder having a number of lines of poles $b$ each line being parallel to its axis, whilst the rotor is in the form of a drum co-axial with the cylinder and having upon it a number of poles $a$ inclined to the axis.

Figure 3 shows diagrammatically an inductor having a double drum $d$ each half of which carries poles $a$ while a magnetizing winding $e$ is arranged between the two halves. $f$ is the stator part of which is shown in the developed view, Figure 4. In this machine all the poles $a$ on one half of the drum will be N and those on the other S. The poles $b$ should be laminated, the laminations being parallel to the axis.

Having described my invention, what I claim is:

1. A high frequency alternator having a member provided with relatively short teeth arranged in lines parallel to the axis of the machine and having windings interwoven with teeth of said lines and a second member rotatable relatively thereto having a plurality of relatively long teeth making an oblique angle with the lines of teeth of said first member.

2. A high frequency alternator having a member provided with teeth arranged in lines parallel to the axis of the alternator and having windings interwoven with teeth of said lines, and a second member provided with two groups of relatively long teeth making an oblique angle with the lines of teeth of said first member and an exciting winding encircling said second member between said groups of teeth, said members being constructed and arranged to provide for relative rotation therebetween.

3. In a high frequency alternator a stator provided with teeth arranged in lines parallel to the axis of the alternator, windings interwoven with the teeth of said lines, a rotor having two groups of relatively long poles inclined to the axis of the alternator, and means for maintaining said groups of opposite magnetic polarity.

4. A high frequency alternator having a member provided with relatively short teeth arranged in lines parallel to the axis of the machine, and a second member rotatable relatively thereto, having a plurality of teeth thereon arranged in the form of a screw thread having ratio of pitch to diameter of greater than unity.

5. A high frequency alternator having a member provided with relatively short teeth arranged in lines parallel to the axis of the machine, and in lines forming planes normal to said axis, and a second member rotatable relatively thereto, having a plurality of teeth thereon arranged in the form of a screw thread having a pitch greater than the diameter of said second member.

6. A high frequency alternator having a member provided with relatively short teeth arranged in lines parallel to the axis of the machine and a second member rotatable relatively thereto having a plurality of teeth thereon arranged in the form of a multiple thread screw having a relatively great pitch.

7. A high frequency alternator having a stator member provided with relatively short teeth arranged in lines parallel to the axis of the machine and a rotor having a plurality of relatively long teeth thereon and arranged in the form of a skew gear.

8. A high frequency alternator comprising a pair of members relatively rotatable with respect to each other, one of said members being provided with a plurality of teeth alined in rows normal to each other on a developed surface and having windings interwoven with teeth of an alined set, and the other of said members having pole pieces of sufficient length to extend across a plurality of rows of teeth in said first member.

9. A high frequency alternator comprising a pair of members relatively rotatable with respect to each other, one of said members being provided with a plurality of teeth alined in rows normal to each other on a developed surface and the other of said members having pole pieces of sufficient length to extend across a plurality of rows of teeth in said first member and disposed at an oblique angle with respect to said lines of teeth.

10. A high frequency alternator having a stator member provided with teeth arranged in lines parallel to the axis of the machine and also in lines forming planes normal to the axis of the machine and having windings interwoven with teeth of an alined set, and a rotor having a plurality of teeth thereon of sufficient axial length to extend across teeth of adjacent lines of said stator.

11. A high frequency alternator having a stator member provided with teeth arranged in lines parallel to the axis of the machine and also in lines forming planes normal to the axis of the machine, and a rotor having a plurality of teeth thereon of sufficient axial length to extend across teeth of adjacent lines of said stator, and said rotor teeth being disposed at an oblique angle with respect to said lines of stator teeth.

CHARLES SAMUEL FRANKLIN.